United States Patent [19]

Mito

[11] Patent Number: 5,507,004
[45] Date of Patent: Apr. 9, 1996

[54] COMMUNICATION CONTROL SYSTEM FOR EITHER PROVIDING BLANK AREAS OR OVERWRITING AREAS IN A RECEIVING RAM DEPENDING ON DEFICIENT OR EXECESS WORD COUNTS IN RECEIVED FRAMES

[75] Inventor: Junichi Mito, Nagoya, Japan

[73] Assignee: Mitsubishi Denki Kabushiki Kaisha, Tokyo, Japan

[21] Appl. No.: 992,774

[22] Filed: Dec. 18, 1992

[30] Foreign Application Priority Data

Dec. 19, 1991 [JP] Japan ................................. 3-336905

[51] Int. Cl.$^6$ ........................................... G06F 12/02
[52] U.S. Cl. ................. 395/854; 395/876; 364/239.3; 364/239.5; 364/245.1; 364/246.3
[58] Field of Search ............................ 395/200, 275, 395/854, 876; 364/200, 900; 371/57.2

[56] References Cited

U.S. PATENT DOCUMENTS

| | | | |
|---|---|---|---|
| 3,626,374 | 12/1971 | Chinlund | 364/200 |
| 3,652,987 | 3/1972 | McCarthy, Jr. | 371/57.2 |
| 3,886,522 | 5/1975 | Barton et al. | 371/57.2 |
| 4,065,810 | 12/1977 | Cramer et al. | 364/200 |
| 4,414,620 | 11/1983 | Tsuchimoto et al. | 364/200 |
| 4,710,871 | 12/1987 | Belknap et al. | 395/200 |
| 4,903,269 | 2/1990 | Fedele | 371/57.2 |
| 4,991,033 | 2/1991 | Takeshita | 360/32 |
| 5,267,251 | 11/1993 | Lenoir et al. | 371/57.2 |

FOREIGN PATENT DOCUMENTS

| | | |
|---|---|---|
| 0025666 | 3/1981 | European Pat. Off. . |
| 3937021 | 5/1991 | Germany . |
| 2-52543 | 2/1990 | Japan . |
| 2-177737 | 7/1990 | Japan . |

OTHER PUBLICATIONS

Electronic Designs, vol. 32, No. 15, Jul. 1984, "Bit-Oriented Coprocessor Resolves Incompatibilities of Small and Large Networks" P. Madan et al, pp. 155–166.

*Primary Examiner*—Thomas C. Lee
*Assistant Examiner*—Marc K. Weinstein
*Attorney, Agent, or Firm*—Sughrue, Mion, Zinn, Macpeak & Seas; Richard C. Turner; Joseph J. Buczynski

[57] ABSTRACT

A communication control apparatus comprises a transmission control section for successively reading out words forming the transmission frame every once from a transmitting RAM in the case of transmission, a receiving control unit for writing the words forming the receiving frame every once in the case of receipt to a receiving RAM, an automatic transmitting timing setting section for repeating the above-described operation correspondingly to the number of frames every unit time in the case of transmission and receipt, and a plurality of transmission and receipt address base registers and transmission and receipt data base registers for storing therein a top address and a word length of the transmitting RAM and the receiving RAM every each transmitting and receiving frame.

21 Claims, 11 Drawing Sheets

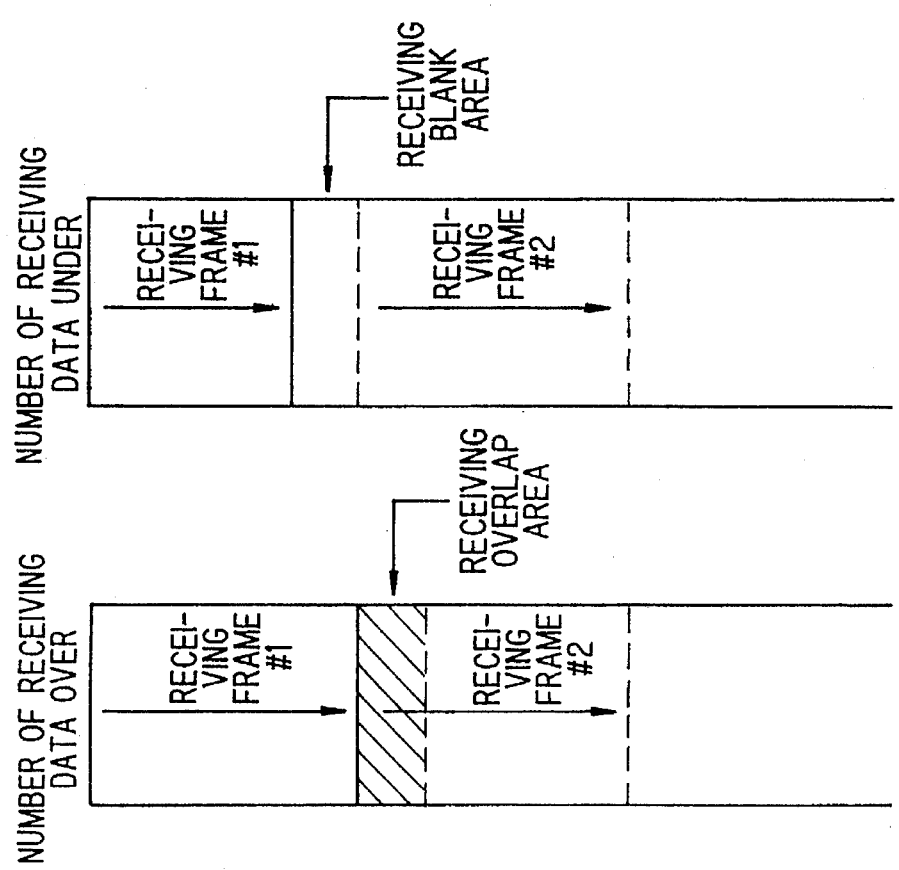
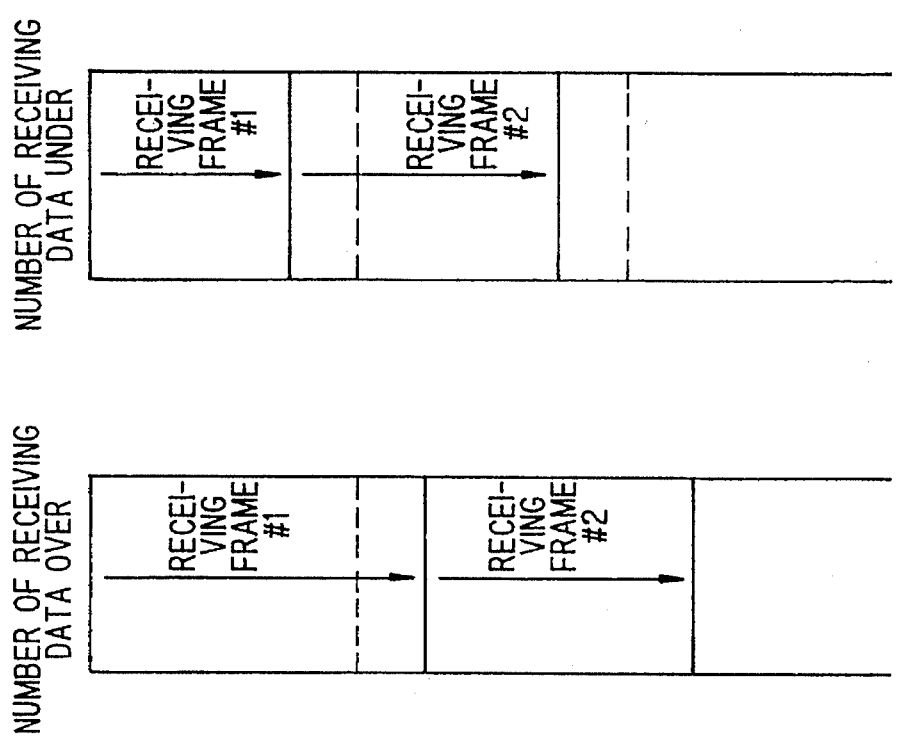
Fig. 6(B)
Fig. 6(A)

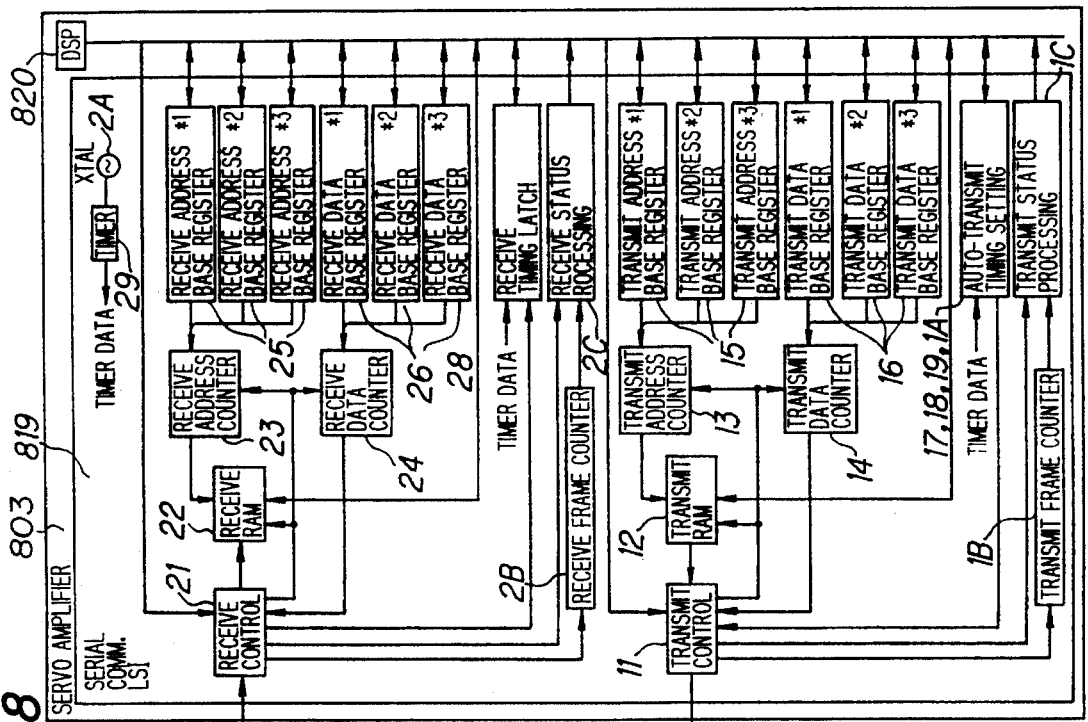
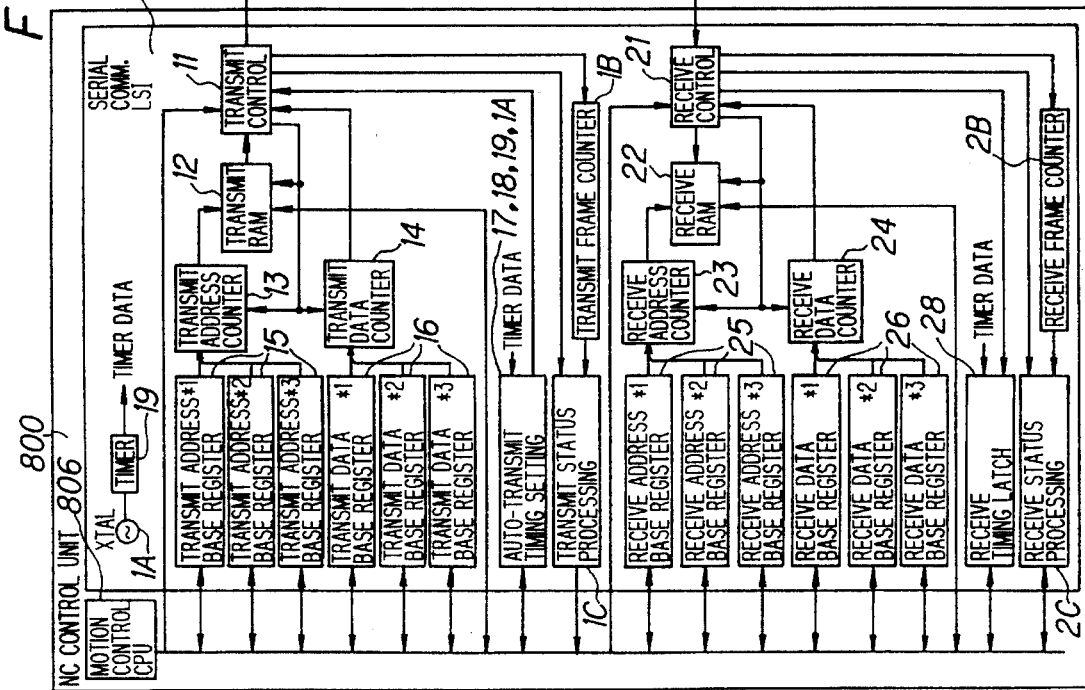
FIG. 8

FIG. 9
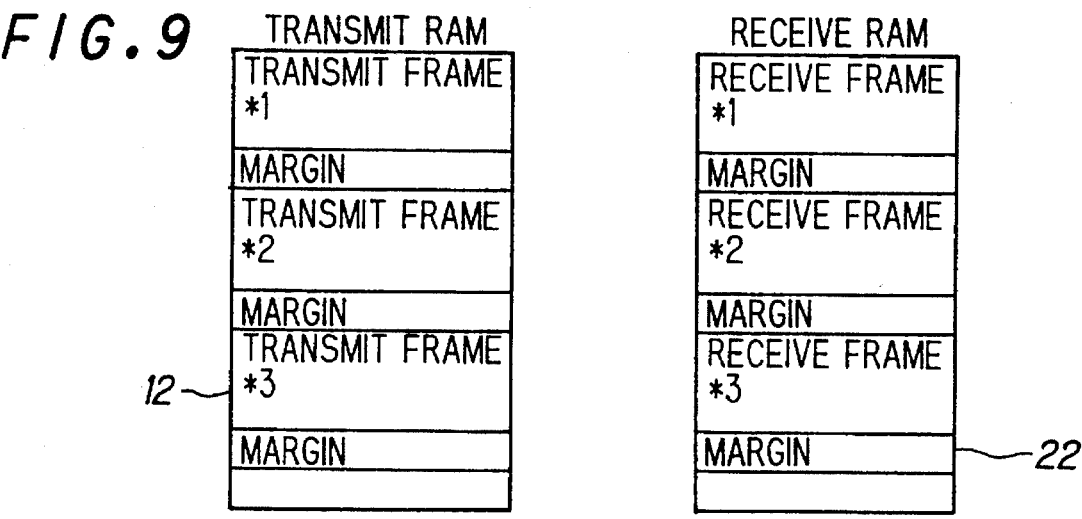
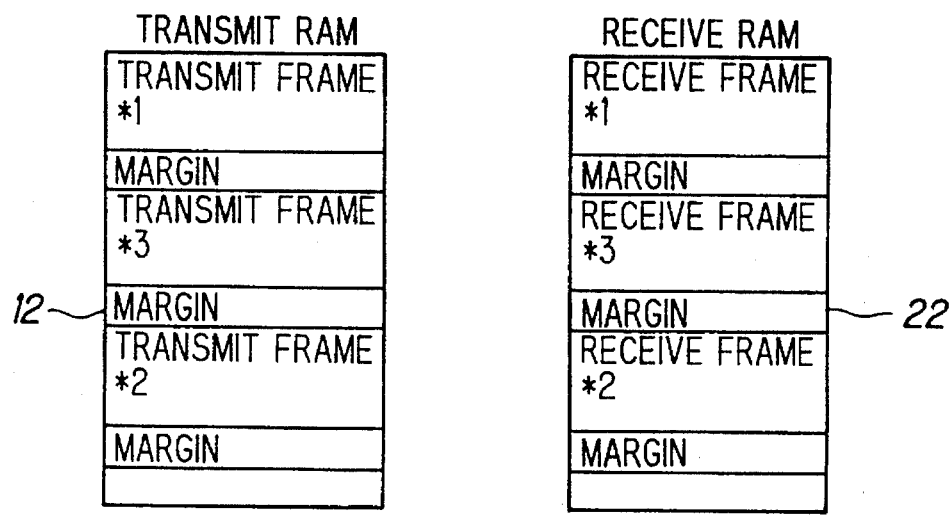
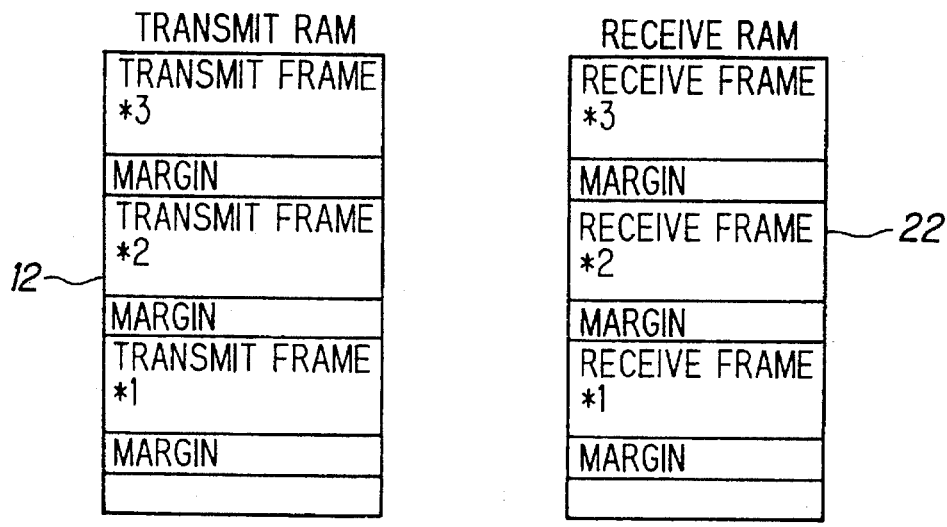

COMMUNICATION CONTROL SYSTEM FOR EITHER PROVIDING BLANK AREAS OR OVERWRITING AREAS IN A RECEIVING RAM DEPENDING ON DEFICIENT OR EXECESS WORD COUNTS IN RECEIVED FRAMES

FIELD OF THE INVENTION

The present invention relates to communication control apparatuses for connecting a host control unit and an I/O control unit to each other in a manner of series communication and, more particularly, to a communication control apparatus for controlling communication between an NC control unit in a numerical control apparatus and a servo-amplifier unit and a main-spindle amplifier unit.

BACKGROUND OF THE INVENTION

A conventional communication control apparatus employs a general-purpose communication control LSI, to execute serial transmission and reception under software control. Conventionally, a memory for storing transmit data and receive data is provided on the outside of the communication control LSI. However, there are many cases where the communication control LSI is formed by a communication control LSI which incorporates or builds therein a small-capacity RAM for storing therein the transmit data and the receive data, because the capacity of the transmit data and the capacity of the receive data are limited correspondingly to a particular application. A system arrangement which realizes the serial communication between the host control unit and the I/O control unit by the use of the above-described communication control LSI is shown in FIG. 10 of the attached drawings.

FIG. 10 is a view showing an arrangement of the conventional communication control apparatus. In FIG. 10, the reference numeral 1 denotes a host control unit; 2, an I/O control unit; 3, a serial-communication transmitting control section for various units; 4, a receiving control section of serial communication for various units; 5, a transmitting address counter for various units; 6, a transmitting data counter for various units; 7, a receiving address counter for various units; 8, a receiving data counter for various units; 9, a transmitting RAM for various units; 10, a receiving RAM for various units; 51, a host CPU of the host control unit 1; and 52, an I/O CPU of the I/O control unit 2.

Further, the reference numeral 701 denotes a data bus for connecting the transmitting RAM 9 for various units and the CPUs 51 and 52 for various units to each other; 702, a data bus for connecting the receiving RAM 10 for various units and the CPUs 51 and 52 to each other; 703, a command and status control line for connecting the CPUs 51 and 52 for various units and the transmitting control section 3 to each other; and 704, a command and status control line for connecting the CPUs 51 and 52 for various units and the receiving control section 4 to each other.

Operation will next be described. Using bus 701, the host CPU 51 writes the transmit data to the transmitting RAM 9, which is arranged within the host control unit 1. Then the transmitting control section 3 reads the transmitting data in terms of one word units and, on the basis of the values in counters 5 and 6, serially transmits the transmitting data. The serial data transmitted from the host control unit 1 are inputted to the receiving control section 4 on the side of the I/O control unit 2, and are successively written to the receiving RAM 10, on the basis of the values in counters 7 and 8. The written data are read by the I/O CPU 52. The same is applicable in a reverse direction.

Furthermore, if the above-described communication control system is applied to a numerical control apparatus, the communication control system takes an arrangement illustrated in FIG. 11. In the numerical control apparatus illustrated in FIG. 11, the data communication, and the preparation, analyzing and processing of the data communication, typically takes place between a servo amplifier unit 803 and the main-spindle amplifier unit (not shown), and an NC control unit 800. Generally, in such system, the communication speed is raised to shorten a communication cycle, by the addition of a motion control CPU 806 capable of processing the data at a high speed, because of the demands for operating the NC machine tool at high speed and high accuracy. Typically, when data is to be transmitted, a base register 15 receives a top or head address for a first frame and the subsequent addresses of the transmitted data frame are identified by an address counter 13, which inputs to the transmit RAM 12. The count of the data for each frame is determined on the basis of a base value of register 16 and a count from that value counter 14, serving as an input to control 11. A similar arrangement for storing plural frames of data on the basis of a head address on register 25 and a count therefrom in counter 23, together with a data base value in resister 26 and a counted value from operation of counter 24 is found to control the serial reception by receive RAM 22 and receive control 21.

The above-described motion control CPU 806 has principal or main processing which includes:

① initial processing: initializing the processing of the serve amplifier unit 803 and the main-spindle amplifier unit;

① background processing: the preparation of transmit data and the analysis of received data to and from the servo-amplifier unit 803 and the main-spindle amplifier unit;

① servo-interruption processing: timing of the transmission to the servo-amplifier unit 803 and the main-spindle amplifier unit and reception from the servo-amplifier unit 803 and the main-spindle amplifier unit.

As another reference technical literature relating to the invention, there are "Receiving Unit For Serial Data" disclosed in Japanese Patent Laid-Open No. HEI 2-52543 and "Multi-Channel Multi-Frame Receiving Circuit" disclosed in Japanese Patent Laid-Open No. HEI 2-177737.

The conventional system has the following problems with reference of FIG. 11. First, there is only one transmitting address base register 15 in each unit (800, 803) which indicates a head or top address of the transmit data in the corresponding transmitting RAM 12. Accordingly, in order to transmit a plurality of frames per unit time, it is required that the CPU resets the top address of the transmitting data used in the subsequent transmitting frame at every point in time that transmission is initiated. The reset top address is needed, to execute processing in which the transmitting section for transmitting an actual transmitting frame restarts. This requirement applies a significant processing load on the CPU, and the processing software is complicated.

Moreover, there are the following problems. First, in the case where a plurality of frames are received, there is only one top-address retaining register 20 for the receiving RAM 22 for storing therein the receive data. Accordingly, in the case where the number of top receiving data bytes including the receiving frames varies by accident or error on the serial transmitting line, in other words, in the case where a length of the frame received previously is short or long when the plurality of frames are received, the receiving RAM storing addresses of the subsequent receiving data are located at different positions. For this reason, the top position in the receiving RAM of the received frame shifts so that the top position of the received frame must be searched for by software processing. Thus, processing due to the software is complicated, and processing time is lengthened.

Further, "Receiving Unit For Serial Data" disclosed in Japanese Patent Laid-Open No. HEI 2-52543 discloses an arrangement in which a plurality of frames are stored in the same memory. In this case, however, data-length information is included in the receiving frame. However, in the case where the data-length information is erroneously recognized by a receiving circuit, the normal receiving operation of a subsequent receiving frame cannot be assured, due to problems with the transmitting line.

A further problem involves the interrupt processing which is conducted at the expose of background processing. Specially, in the communication control system in the numerical control apparatus, interruption of the motion-control CPU 806 occurs with a variable cycle. Accordingly, the cycle is shortened in the case where a high speed and a high accuracy are required, and frequency of the servo-interruption processing increases. Accordingly, the time available for generation of the transmitting data and analysis of the receiving data is shortened.

SUMMARY OF THE INVENTION

It is therefore a first object of the invention to provide a communication control apparatus in which a burden or load of a processing CPU can be reduced, processing by a software can be simplified, and processing time can be shortened.

It is a second object of the invention to provide a communication control apparatus in which, notwithstanding the presence of an error in a preceding receiving frame, it is possible to properly receive a subsequent receiving frame.

It is a third object of the invention to provide a communication control apparatus in which the servo-interruption time can be shortened in order to improve the control of a servo-motor and a main-spindle motor, and the number of interrupts can be reduced to increase the background processing time.

According to the invention, there is provided a series communication between a host control unit and an I/O control unit, which comprises (1) a plurality of transmitting address base resisters for storing plural transmission-start addresses on a transmitting RAM, and (2) a plurality of transmitting data-base registers for storing plural transmitting data lengths of respective frames. As a result of this structure, once a CPU can prepare transmitting data corresponding to a plurality of frames on the transmitting RAM, subsequent transmission of the plurality of frames can automatically be made without further intervention of CPU processing.

Further, there is also provided a series communication between the host control unit and the I/O control unit, which comprises (1) a plurality of receiving address base resisters for storing plural receiving-frame-data storing start addresses on a receiving RAM, and (2) a plurality of receiving data-base registers for storing plural receiving data lengths of respective receiving frames. As a result of this structure, it is possible to receive a plurality of frames without the need for a CPU to identify or confirm the receiving data every frame.

The plurality of transmitting address base registers and transmitting data base registers in this invention are arranged such that the plural transmitting RAM top addresses and the plural transmitting data counts are set at the time that transmission begins for every frame. Also, transmitting address counter are loaded before the transmitting data counter before start of transmission of each frame begins. The transmitting address counter and the transmitting data counter are increased and decreased in accordance with the transmitting data demands from the transmission control section. Also, detection of generation of readout addresses of the transmitting RAM and detection of termination of the transmitting frames due to the fact that the transmitting data counter becomes "0" are executed.

A transmitting timing setting section sets timings for transmitting the plurality of transmitting frames per unit time.

Furthermore, the plurality of receiving address base registers and the plurality of receiving data base registers are arranged such that, similarly to the case of transmission, the receiving RAM top addressees and the number of receiving data counts at start of reception of each frame are set, and are loaded to the receiving address counter and the receiving data counter before the start of receiving of each frame. Similarly to the case of transmission after the start of receiving, the receiving RAM top addressees and the number of receiving data counts at start of receiving are increased and decreased in accordance with a writing demand to the receiving RAM of the receiving data. These are used for the detection of errors in the case where the receiving frame due to the results of generation of the writing addresses to the receiving RAM and the receiving data count is longer or shorter than a predetermined or prescribed value.

As described above, according to the invention, the transmission of a plurality of frames can automatically be executed at predetermined timing per unit time (a period of time during which the CPU executes writing of the transmission RAM, reading of the receiving RAM and read and write processing of the register, only one time). Since data of the plurality of receiving frames are automatically written to the receiving RAM simultaneously so that the CPU can confirm the receiving data of the plurality of frames at one time, it is possible to reduce the processing burden or load on the CPU.

Further, since the top addresses for writing the receiving RAM are separately provided every receiving frame, even in the case where the number of receiving data words including the receiving frames varies due to an error on the transmission line, the receiving RAM storing addresses for the receiving data on the subsequent receiving frame are predetermined or constant. Accordingly, it is unnecessary to performs a software search the top position of the receiving frame. Thus, the software processing can be simplified.

Furthermore, even in the case where the receiving frame length varies due to differences in the application software, since the receiving RAM top address is determined every receiving frame, it is the top storing position every receiving frame. Thus, the receiving data processing of the CPU requires only simple software processing and a high speed processing time can be achieved. Moreover, in the case of the transmission process, since the top address of the transmission RAM is determined every frame regardless of the transmitting frame length, the transmission data processing of the CPU on the basis of the software processing can be simplified and the processing time can achieve high speed.

Other objects and features of this invention will become understood from the following description with reference to the accompanying drawings.

BRIEF DESCRIPTION OF THE DRAWINGS

FIG. 6 is a view showing a difference, during a receiving data storing condition with respect to the receiving RAM in a plurality of receiving frames, between a conventional example (A) and the invention (B);

FIG. 8 is a block diagram showing an arrangement in the case where the communication control system according to the invention is applied to a numerical control apparatus;

FIG. 9 is a view showing a shunting or replacement concept between transmitting and receiving frames according to the invention;

DESCRIPTION OF THE EMBODIMENTS

Various embodiments of the invention will be described hereinafter.

Figure 1:
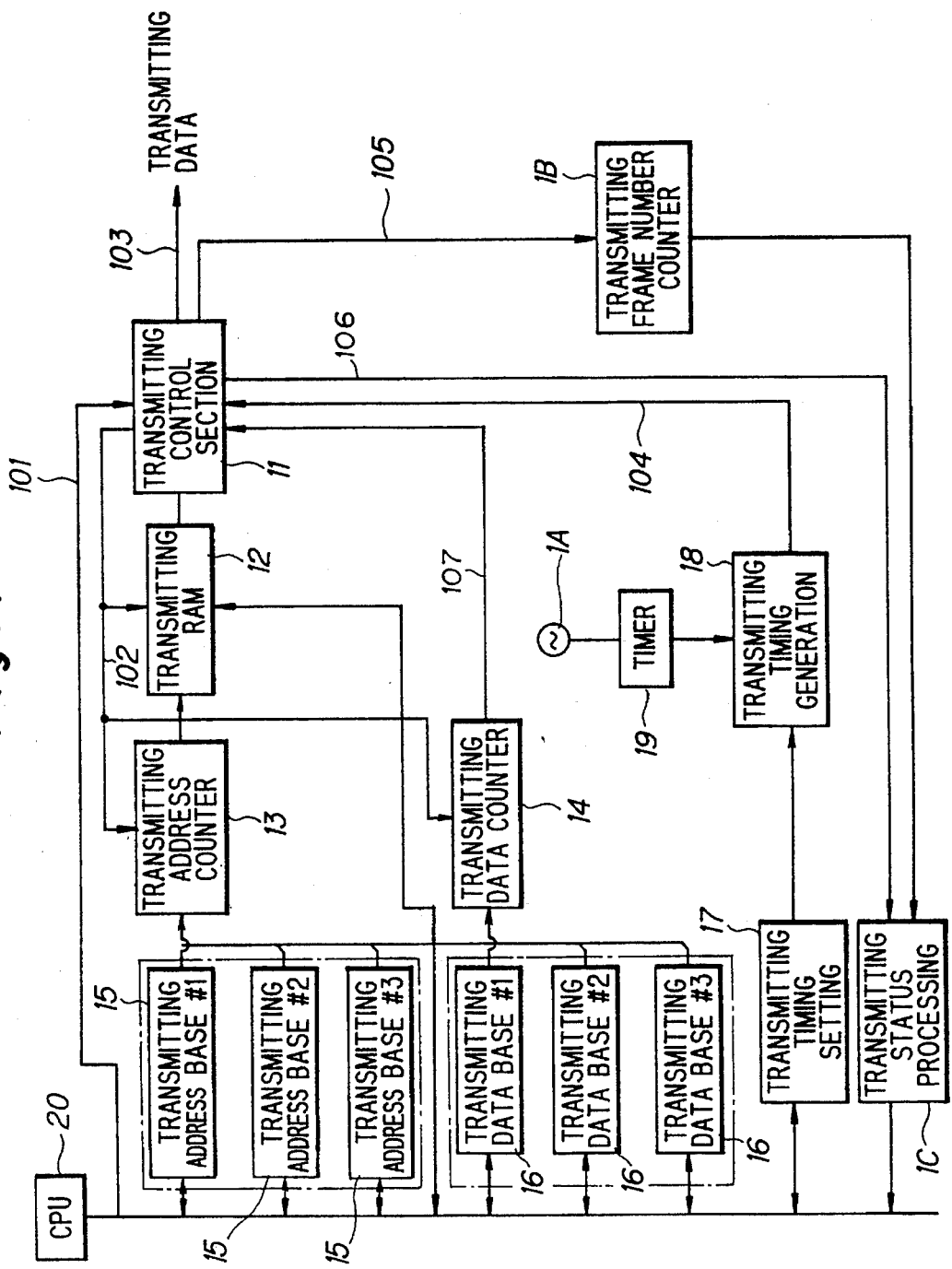
FIG. 1 is a block diagram showing a hardware arrangement of a series transmitting section according to the invention.
Figure 2:
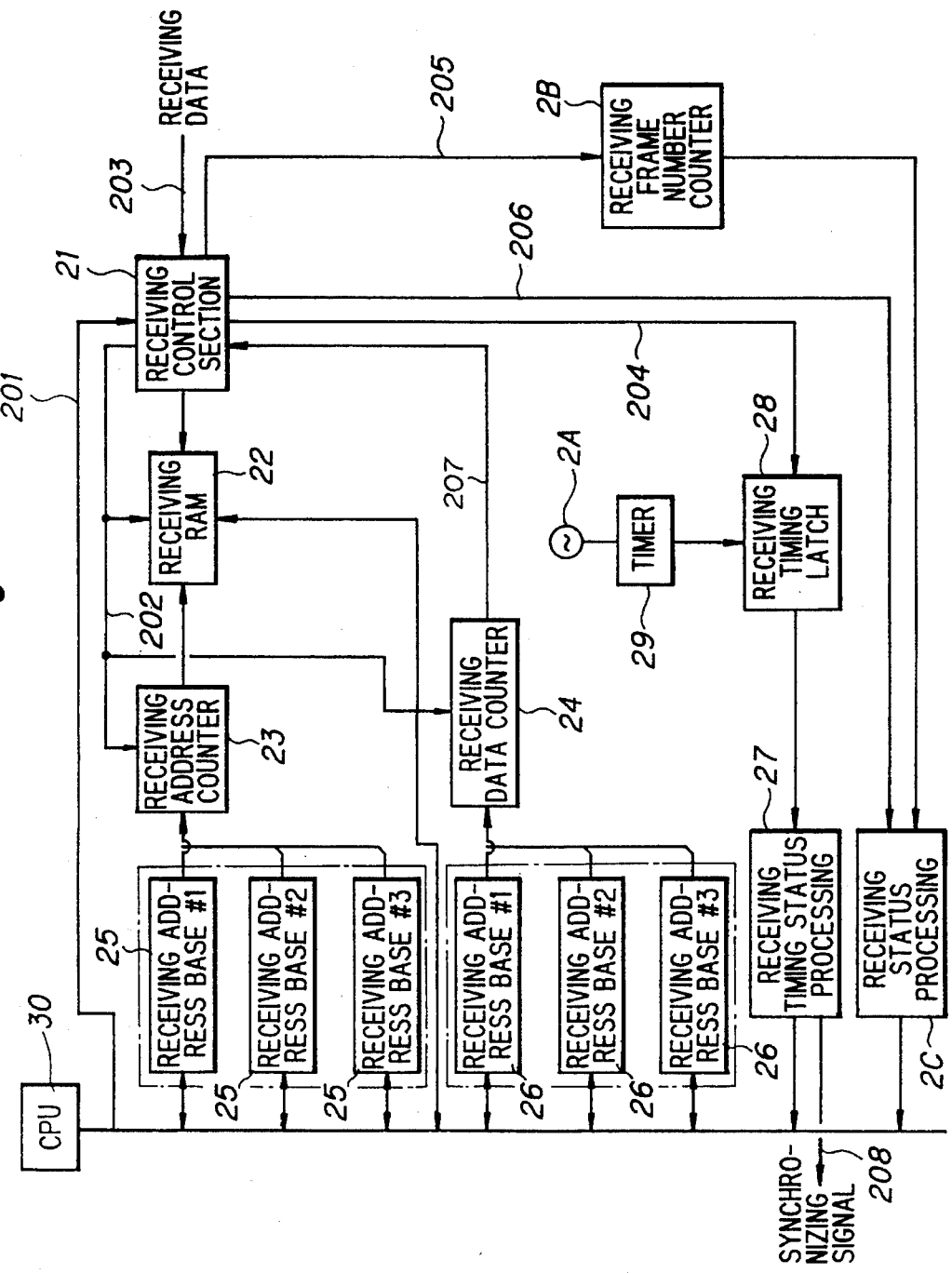
FIG. 2 is a block diagram showing a hardware arrangement of a series receiving section according to the invention.

Referring first to FIG. 1, there is shown a series communication transmitting section according to the invention. FIG. 2 is a view of a hardware arrangement of a series communication receiving section according to the invention. The reference numeral 11 denotes a transmitting control section which converts parallel data read out of a transmitting RAM 12 to series data to execute a transmission on line 103 in plural frames; 12, the transmitting RAM; 13, a transmitting address counter for generating read addresses of the transmitting RAM 12 at execution of the series communication; 14, a transmitting data counter for counting the numbers of transmitting data counts every frame; 15, transmitting address base registers (#1~#3) for retaining a top address in the transmitting RAM 12 for transmitting data in corresponding one of a plurality of frames; 16, transmitting data base registers (#1~#3) for retaining the number of transmitting data counts for a corresponding one of a plurality of frames; 17, a register for setting transmitting timing per unit time; 18, a transmitting timing generating section for generating an actual transmitting start signal on the basis of a signal from the transmitting timing setting register 17 and a signal from a timer 19; 19, the timer; 1A, an oscillator; 1B, a transmitting frame number counter for counting the number of frames whose transmission has been completed; and 1C, a transmitting status processing section for informing a condition to the CPU 20.

Next, as shown in FIG. 2, the reference numeral 21 denotes a receiving control section for converting received series data on line 103 to parallel data to write the converted data to a receiving RAM 22; 22, the receiving RAM; 23, a receiving address counter for generating a writing address of the receiving RAM 22 at execution of the series receipt; 24, a receiving data counter for counting the number of received data counts every receiving frame; 25, receiving address base registers (#1~#3) for retaining a top address in the receiving RAM 22 for receiving data in a corresponding one of a plurality of receiving frames; 26, receiving data base registers (#1~#3) for retaining the number of receiving data counts for a corresponding one of a plurality of every receiving frames; 27, a receiving timing status processing section for retaining the timing at which each receiving frame is received, for reference by the CPU 30; 28, a receiving timing latch section for latching a timer value at the time the receiving start signals every receiving frame are received from the receiving control section 21; 29, the timer; 2A, an oscillator; 2B, a receiving frame number counter for counting the number of frames completed in receipt; and 2C, a receiving status processing section for informing a condition to the CPU 30.

Figure 3:
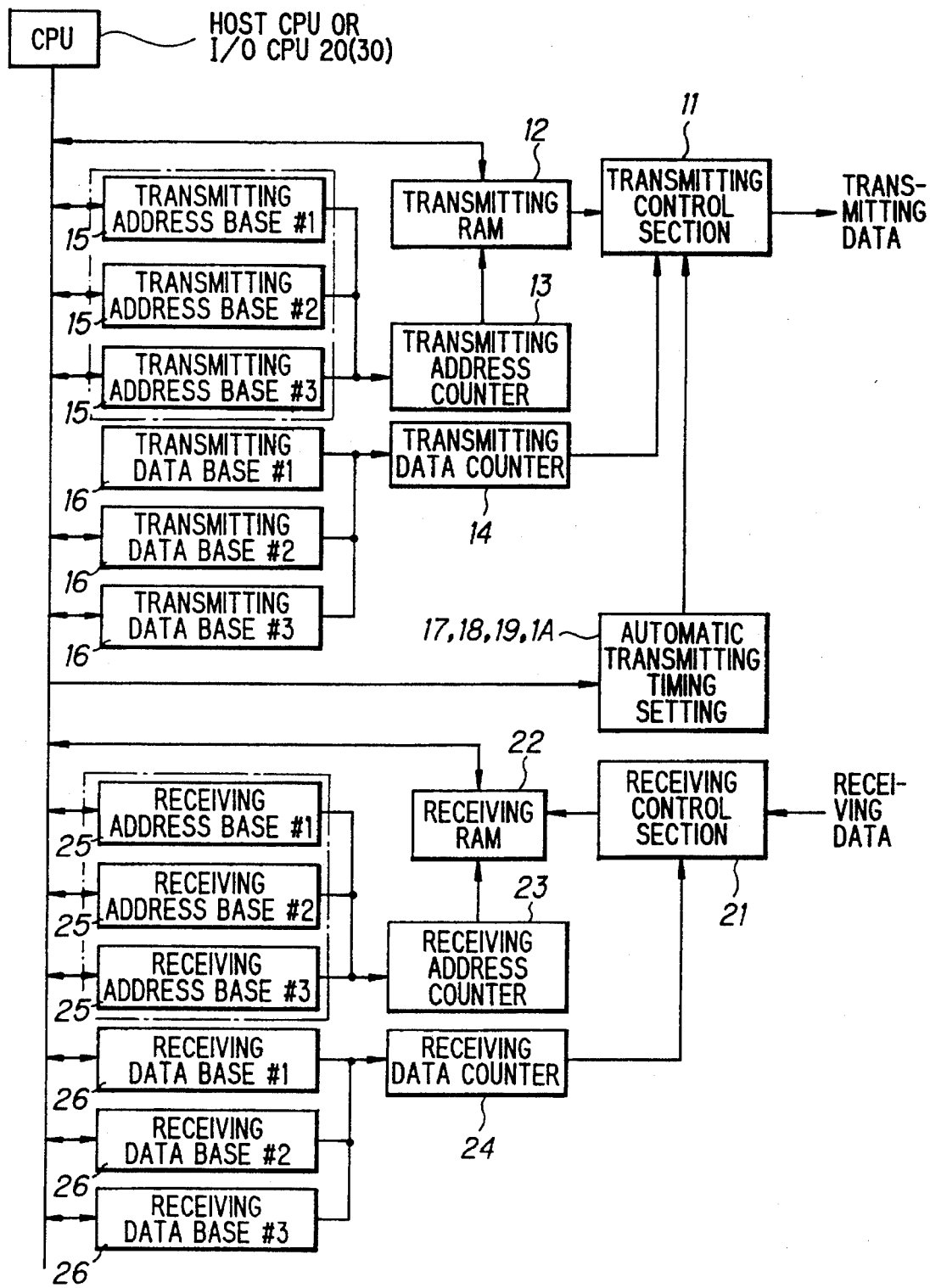
FIG. 3 is a block diagram showing an arrangement in which the series transmitting section illustrated in FIG. 1 is combined with the series receiving section illustrated in FIG. 2.

FIG. 3 is an internal block diagram in the communication control. LSI in which the series transmitting section illustrated in FIG. 1 and the series receiving section illustrated in FIG. 2 are combined with each other. The details of FIGS. 1 and 2 are omitted.

Figure 4:
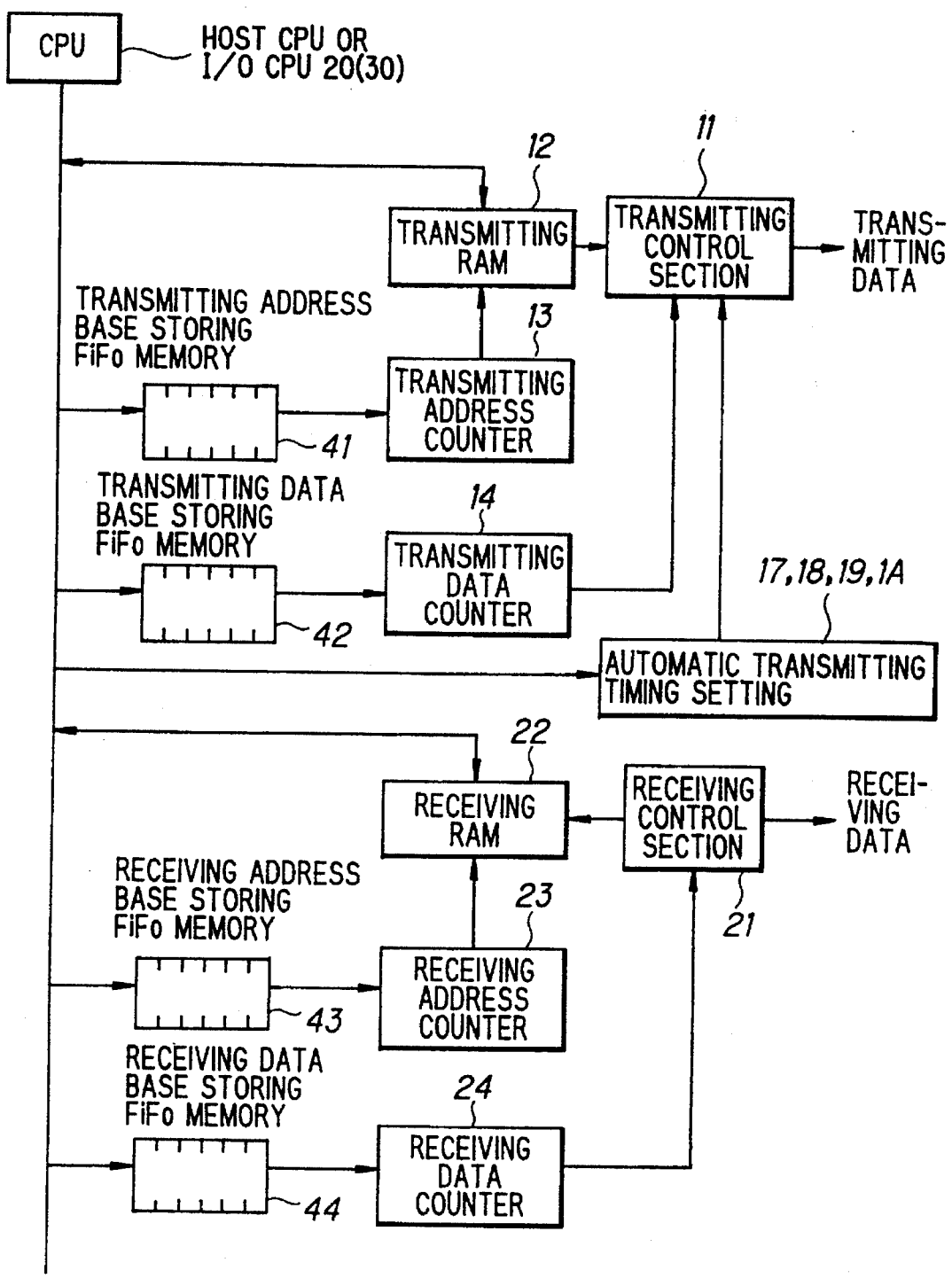
FIG. 4 is a block diagram showing a hardware arrangement at the time means illustrated in FIG. 1 for storing therein a top address and a data length is formed by an FIFO memory.

FIG. 4 shows an arrangement in which the transmitting address base registers 15 (#1~#3) illustrated in FIG. 3 are replaced by a transmitting address base storing FIFO memory 41, the transmitting data base registers 16 (#1~#3) are replaced by a transmitting data base storing FIFO memory 42, the receiving address base registers 25 (#1~#3) are replaced by a receiving address base storing FIFO memory 43, and the receiving data base registers 26 (#1~#3) are replaced by the receiving data base storing FIFO memory 44.

Figure 5:
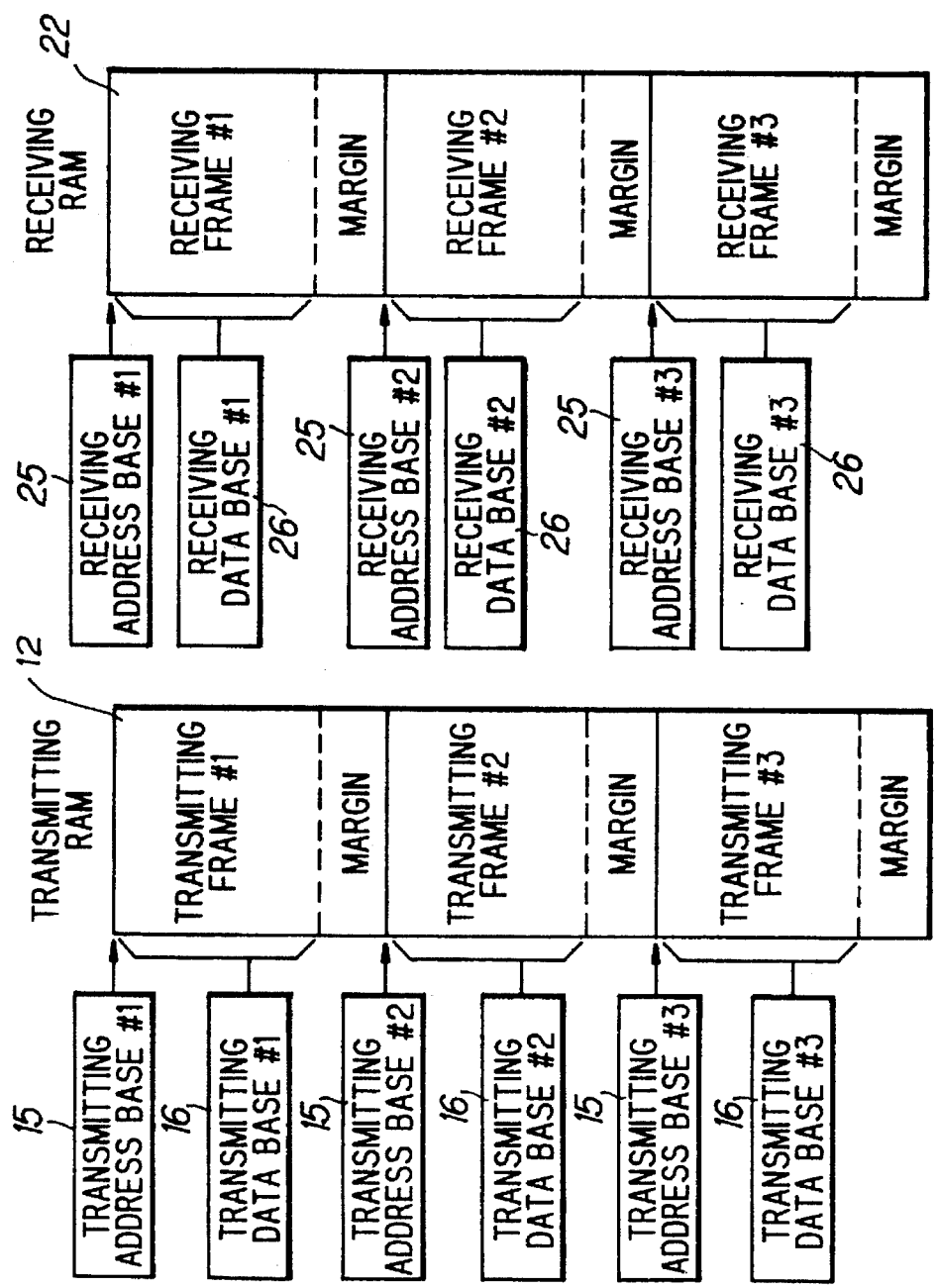
FIG. 5 is a view showing a relationship between a transmitting (receiving) address data base register in a transmitting RAM and a receiving RAM according to the invention and transmitting (receiving) data base registers.

FIG. 5 is a view showing a relationship among each transmitting address base register 15 in the transmitting RAM 12 and the receiving RAM 22, each transmitting data base register 16, each receiving address base register 25 and each receiving data base register 26. Further, FIG. 6 shows the differences between the arrangement of storage of the receiving data with respect to the receiving RAM 22 in the plurality of receiving frames of the conventional example (A) and the arrangement of storage in accordance with the present invention (B).

The basic or fundamental operation of the series communication is the same as that of the conventional example. Accordingly, a description of the basic operation will be omitted, and only a portion of the operation relating to the present invention will be described. In the series transmitting section illustrated in FIG. 1, the transmitting address base registers 15 (#1~#3) and the transmitting data base registers 16 (#1~#3) retain a top address of the transmitting RAM 12 in which the transmit data for each of a plurality of successively transmitted frames are located, and the transmitting data length of each such frame. When the CPU 20 applies a starting command to the transmitting control section 11 through the line 101, the transmitting control section 11 increases the transmitting address counter 13 and decreases the transmitting data counter 14 through the line 102, and outputs a readout signal to the transmitting RAM 12, to read out the transmitting data from the transmitting RAM 12. The transmitting control section 11 forms the readout transmitting data into a transmitting frame, and feeds out the transmitting frame through the line 103 as serial transmitting data.

The case where it is desired to transmit a plurality of frames actually means a case where the plural transmitting frames are desired to be successively transmitted within a certain time interval. In this manner, it is possible to set the transmit data of the plurality of frames entirely to the transmitting RAM 12 by a single CPU processing. If the transmitting data of the plurality of frames can be transmitted once or at a time as a whole, it is unnecessary to divide the transmitting data into a plurality of separate frames. Accordingly, a case where transmission of the plurality of frames is executed means that the host control unit 1 and the I/O control unit 2 opposed to each other execute transmission at predetermined time intervals. For this reason, the transmission timing setting register 17 and the timer 19 are provided as inputs to timing generator 18 so that it can output a transmitting start signal to the transmitting control section 11 through the line 104 on the basis of the timer value and the value which is beforehand set in the transmitting timing setting register 17 by the CPU 20.

Even if a start command is issued by CPU 20 to the transmitting control section 11 through the line 101, the transmitting control section 11 does not start at once. Instead, readout of the transmitting data is commanded by a signal from section 11 on the line 102, but the start of transmission will be delayed until the transmitting timing signal appears on line 104. Here, the transmitting address base register 15 and the transmitting data base register 16 are used in order successively from the #1 registers. After the first transmitting frame is transmitted, address and data information for the #2 registers is loaded to the transmitting address counter 13 and the transmitting data counter 14. Thus, preparation for the next transmission is complete. Since the transmitting control section 11 has already received a start of transmission command through the line 101 from the CPU 20, a subsequent transmitting frame may be transmitted as soon as the subsequent transmitting timing on line 104 is received.

The transmitting control section 11 increases the transmitting frame number counter 1B by inserting a signal on line 105 each time a sending of the transmitting frame is completed. Also, the present condition of the transmitting control section 11 is provided to the CPU 20 through the line 106, via the transmitting status processing section 1C. Further, the contents of the transmitting frame number counter 1B are also inputted into the transmitting status processing section 1C. Thus, it is possible for the CPU 20 to identify or confirm what number of frame is transmitted. The transmitting control section 11 decreases the transmitting data counter 14 as transmission starts. If the transmitting control section 11 detects that the count value reaches "0" through the line 107, the transmitting frame is completed.

The series receiving section will next be described with reference to FIG. 2. In the case of receiving processing, the receiving control section executes an operation similar to that in the case of transmission through the line 201 as receiving data are inputted into the line 203. However, the receiving processing is different from transmission in that the receiving data are written by control section 21 into the receiving RAM 22. The receiving address counter 23 gives the receiving data writing address to the receiving RAM 22, and the receiving data counter 24 counts the number of receiving bytes via line. However, a receiving count value is referred to only in the receiving control section 21, but receiving is not completed.

Although not shown, if the receiving data number for every frame received is known beforehand, a means for storing the number of specified receiving data every receiving frame is provided, whereby the results of the receiving data counter 24 and the means for storing the number of specified receiving data are compared with each other. In this manner, it is possible to detect an abnormality of the receiving frame. The receiving frame having a data number abnormality can be identified, through the receiving status processing section 2C.

A signal is outputted on the line 205 every detection of completion of the receiving frame, and the receiving frame number counter 2B counts up. The line 206 is provided for informing the condition of the receiving control section 21 to the CPU 30, and is processed together with a value of the receiving frame number counter 2B by the receiving status processing section 2C. Furthermore, the case of receiving is different from the case of transmission in that a timer value at the time of starting of the specific receiving frame is latched, and the latch information is processed by the receiving timing status processing section 2C.

The timing information is capable of being utilized for synchronization between the host control unit 1 and the I/O control unit 2. Specifically, a synchronizing signal is outputted to the line 208 at detection of the specific address added to the top of the receiving frame. For example, it is possible for the signal to apply presetting of a reference timer within the control unit and to apply presetting to the timer 19 of the series transmitting section illustrated in FIG. 1, to synchronize the timer 19 in the series transmitting section with the receiving timing of a certain specific receiving frame.

Advantages provided by the plurality of memory means for the plurality of transmitting address bases, the transmitting data bases, the receiving address bases, and the receiving data bases, will next be described with reference to FIGS. 5 and 6.

First, the transmitting address base indicates a separate top address of the transmitting data for each of the plurality of transmitting frames stored in the transmitting RAM 11, while the receiving address base indicates a separate top address of the receiving data for each of the plurality of receiving frames stored in the receiving RAM 22. This facilitates processing because the top address is decided or determined beforehand when the CPU 20 and 30 write the transmitting data to the transmitting RAM 11 or read out the receiving data from the receiving RAM 22.

Subsequently, the transmitting data base indicates the transmitting data length for every predetermined frame, while the receiving data base indicates the receiving data length for every predetermined frame. Here, since there are cases where the transmitting data length and the receiving data length vary depending upon an application and the like, it is desirable for the invention to provide a margin, for each frame in the RAM region or area.

Further, as illustrated in FIG. 6, the conventional example (A) has a problem in that, as there may be an excess or a shortage in the number of receiving data that is included in the receiving frames, the storing position in the receiving RAM 22 for the next receiving frame will shift or slide. For example, when the top position is fixed, as indicated by the dotted line in FIG. 6 (A), an example of data in frame #1 will overflow into frame #2 while a shortage in flame #1 will cause frame #2 to begin prior to the predetermined top position. According to the invention, however, in the case where the number of received data in a current frame (#2) exceeds the number of received data in a frame #1 received previously, the writing of the subsequent receiving data may be overlapped. Referring to FIG. 6(B), where the number of receiving data is under, a blank area is formed before the subsequent frame #2. Thus, the top position of the receiving frame #2 does not slide or shift.

In the above-described embodiment, as a method of setting the plurality of transmission start addresses, the plurality of transmitting data counts, the plurality of transmission starting addresses and the plurality of receiving data counts, a case where the registers are used is illustrated. However, the method may be arranged by memories such as FIFO memories or the like as illustrated in FIG. 4, because the registers are used in order.

Further, since the receiving data counter 24 is used only to judge whether or not the number of receiving data of the receiving frame is a prescribed or specified value, the receiving data counter 24 may be deleted from the arrangement. Furthermore, the synchronizing signal 208 illustrated in FIG. 2 indicates the case where the synchronizing signal is outputted at detection of a specified address of the receiving frame. However, the synchronizing signal 208 may be outputted at receiving a predetermined number of receiving frame, depending upon the number of the receiving frames.

Figure 7:
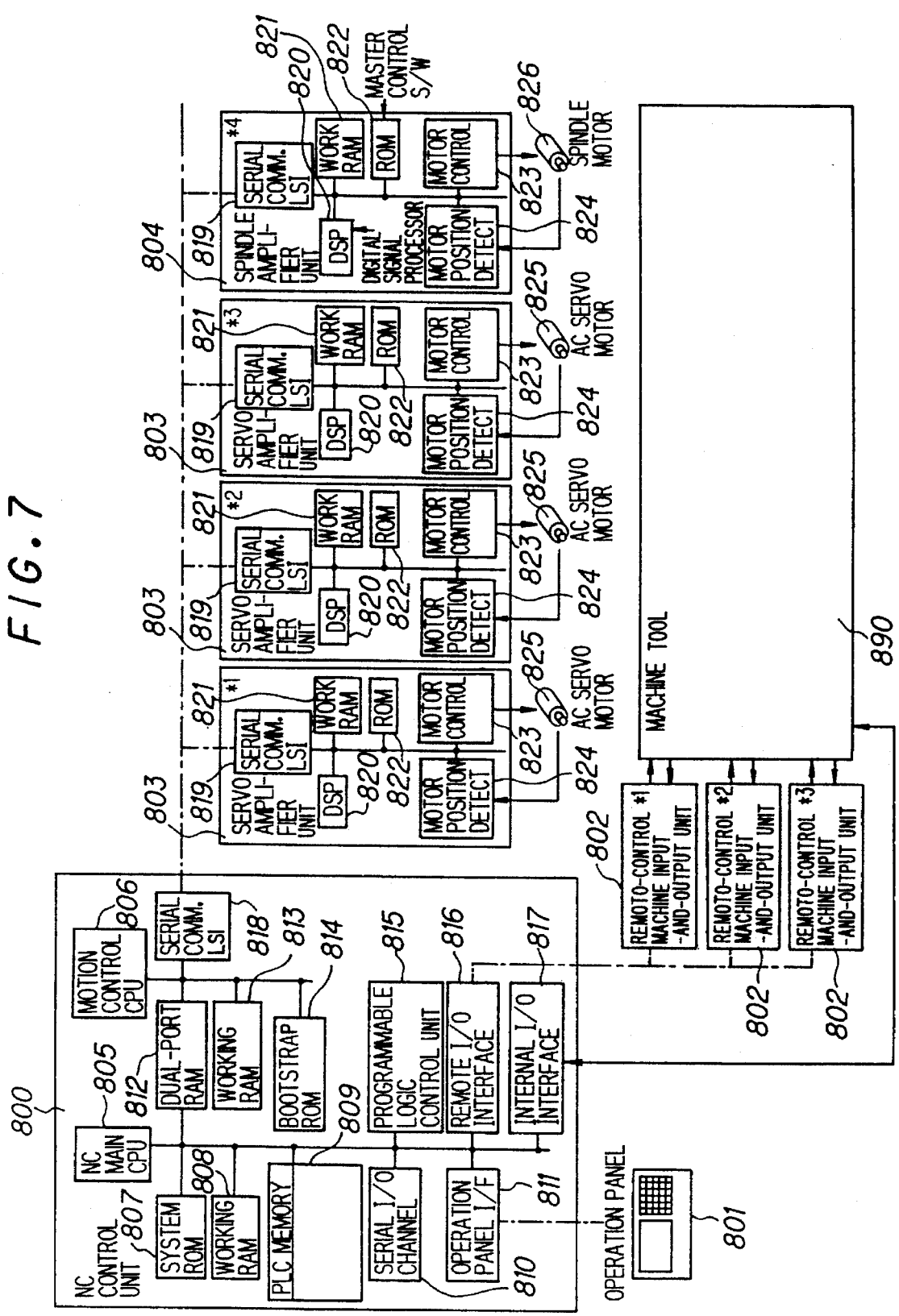
FIG. 7 is a block diagram showing a communication system of a general numerical control apparatus.
Figure 10:
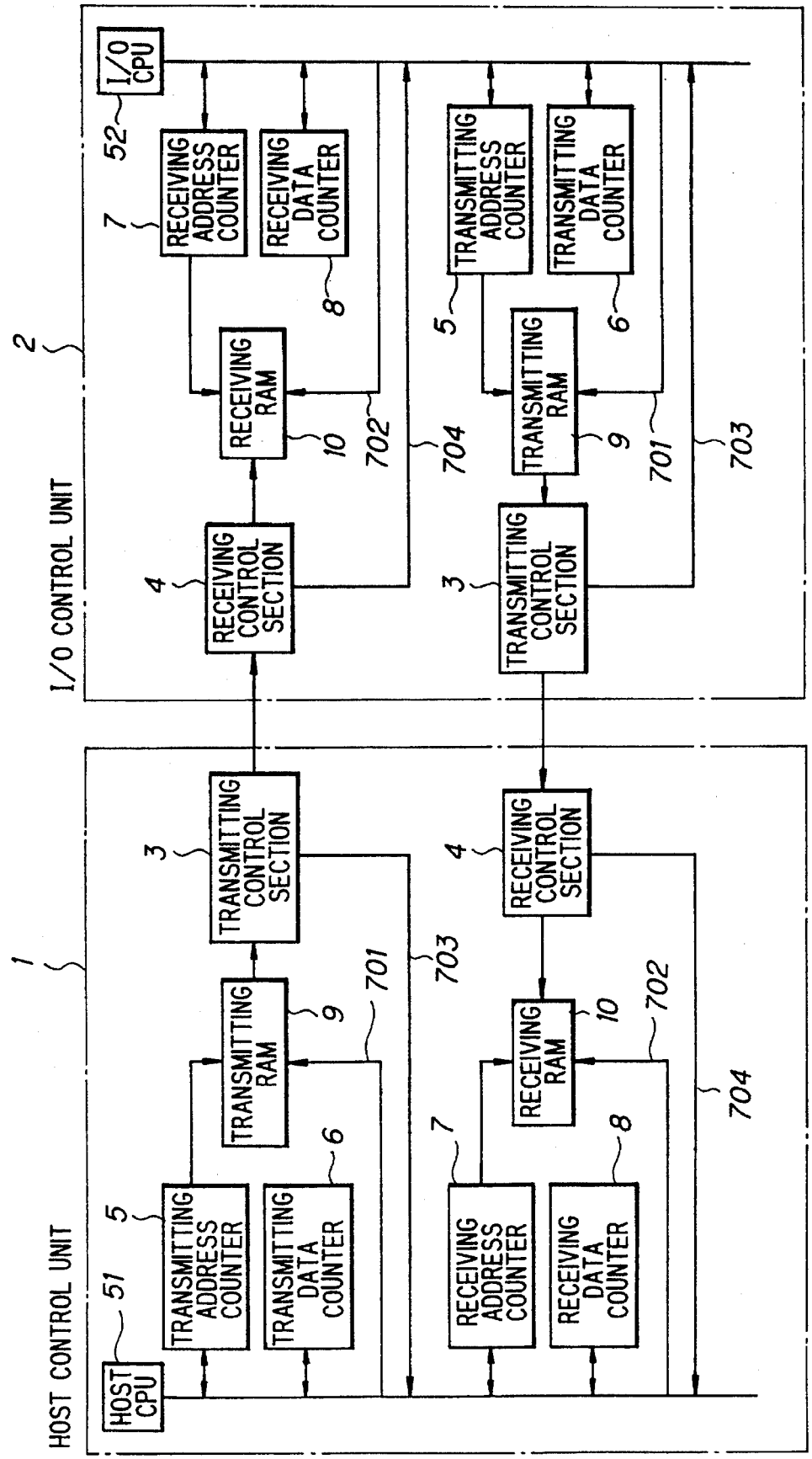
FIG. 10 is a block diagram showing an arrangement of a conventional communication control apparatus.
Figure 11:
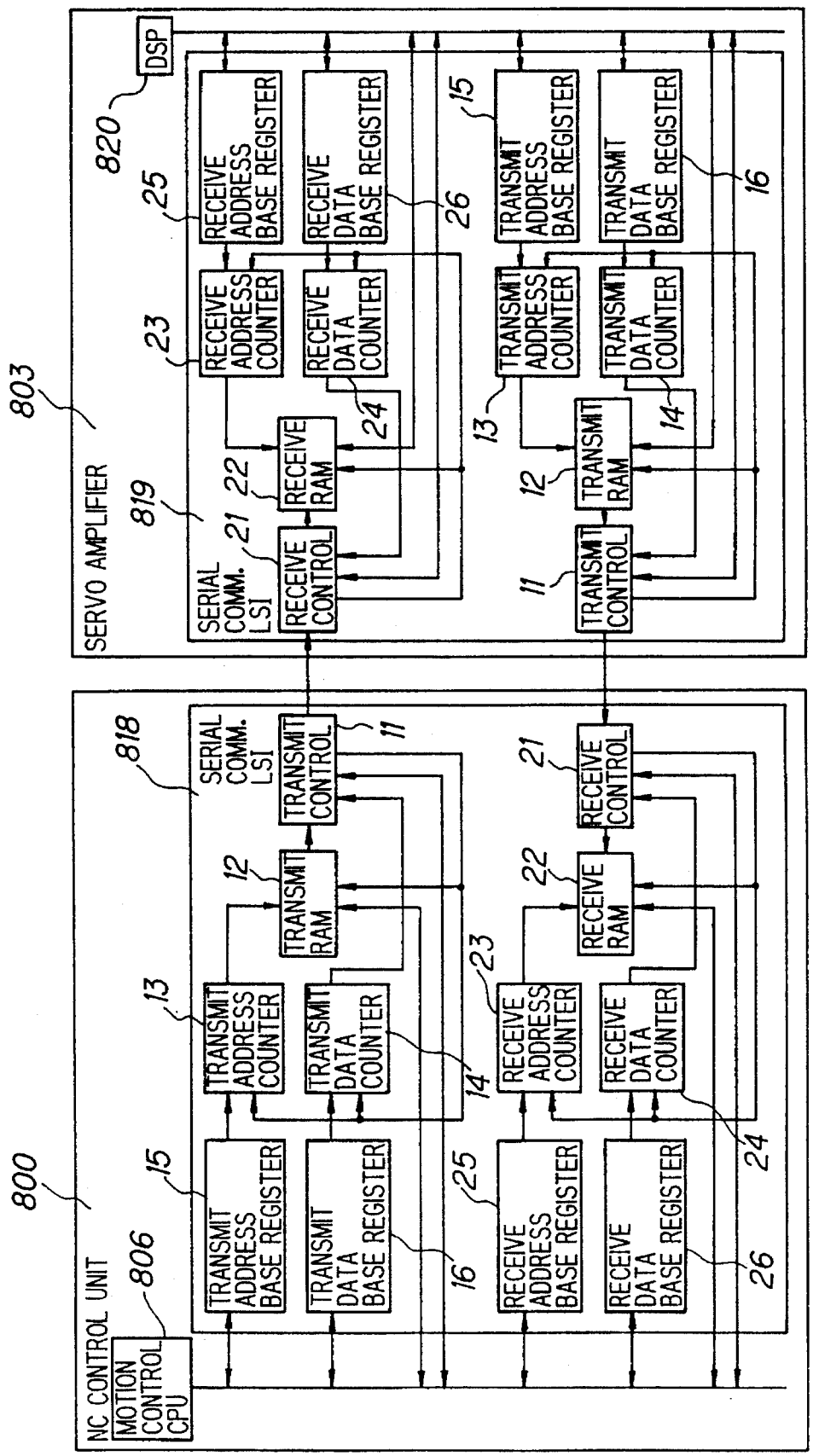
FIG. 11 is a block diagram showing arrangement of a communication control system in the conventional numerical control apparatus.

An example in which the communication control apparatus described previously is applied to the numerical control apparatus will next be described. As shown in FIG. 7, the numerical control apparatus comprises an NC control unit 800, an operating panel 801, a remote-control machine input-and-output unit 802, a machine tool 890, a servo-amplifier unit 803, and a main-spindle amplifier unit 804.

The NC control unit 800 comprises an NC main CPU 805, a motion control CPU 806, a system ROM 807, a working RAM 808, a PLC memory 809, a serial I/O channel 810, an interface 811 for the operating panel 801, a two-port RAM 812, a working RAM 813, a boot strap ROM 814, a programmable logic control unit 815, an interface 816 for the remote-control machine input-output unit 802, an interface 817 for the machine tool 890, a servo-amplifier unit 803, and a serial communication LSI 818 executing communication with the main-spindle amplifier unit 804.

The servo-amplifier unit 803 and the main-spindle amplifier unit 804 comprise a serial communication LSI 819, a DSP (digital signal processor) 820, a work RAM 821, a ROM 822, a motor control section 823 for executing control of an AC servo-motor 825 and a main-spindle motor 826, and a motor position detecting section 824 for executing positional detection of an AC servo-motor 825 and a main-spindle motor 826.

FIG. 8 is a view for explanation in the case where the above-described communication control system illustrated in FIGS. 1 through 3 is applied to the numerical control apparatus. The arrangement illustrated in FIG. 8 is different from the arrangement illustrated in FIGS. 1 through 3 only in that the host control unit 20 is changed to the NC control unit 800, and the I/O control unit 20 is changed to the servo-amplifier unit 803, and is the same in other arrangement and function or operation as the arrangement illustrated in FIGS. 1 through 3.

The above-described communication control system is applied to the numerical control apparatus, whereby, first, servo-interruption processing time can be shortened, the number of interruptions can be reduced, and the background processing time can be increased in order to improve control performance of the servo-motor 825 and the main-spindle motor 826. Secondly, there are many cases where changing in order, addition, connection, demounting and the like of the servo-amplifier unit 803 and the main-spindle amplifier unit 804 are executed. As shown in FIG. 9 however, software processing is made easy by simply changing the transmission and receipt address base registers 15 and 25 and the transmission and receipt data base registers 16 and 26 in the transmitting RAM 12 and the receiving RAM 22. Thirdly, boundary searching processing with respect to the subsequent frame due to erroneous receipt of the receiving frame is made unnecessary.

Although the invention has been described with respect to specific embodiments for a complete and clear disclosure, the appended claims are not to be thus limited but are to be construed as embodying all modifications and alternative constructions that may occur to one skilled in the art which fairly fall within the basis teaching herein set forth.

What is claimed is:

1. A communication control apparatus comprising:
   a host control unit;
   a serial communication means;
   an I/O control unit connected to said host control unit by said serial communication means;
   wherein each of said host and I/O control unit comprises:
      means for executing transmission and receipt of data in a plurality of frames between said host control unit and said I/O control unit during every predetermined unit of time via said serial communication means;
      first means for successively reading out data forming a transmitting frame once every said predetermined unit of time from a transmitting RAM when data transmission is to occur;
      second means for successively writing data forming a receiving frame once every said predetermined unit of time in a receiving RAM when data receipt occurs;
      third means for controlling the repeating of said transmission and receipt operations by said first and second means in correspondence with said predetermined unit of time;
      fourth means for storing therein a plurality of top addresses and a plurality of word lengths for said transmitting RAM and said receiving RAM, a separate top address being provide for each transmitting and receiving frame, said fourth means storing the receiving word length of every said receiving frame which has been determined before said receiving frames are written to said receiving RAM;
      count means for counting the number of receiving words included in each said receiving frame as received to provide a count value;
      comparing means for comparing the receiving word lengths stored in said fourth means to said count value;
      status information retaining means, responsive to said comparing means, for determining an excess or deficiency of the number of receiving words in a receiving frame; and means for causing said receiving RAM to provide a blank area in its memory between memory locations where a receiving frame having a deficiency in the number of receiving words and a subsequent receiving frame, respectively, are stored, and causing said receiving RAM to allow a subsequently received receiving frame to be stored in a portion of a memory area in which a frame having an excess in the number of receiving words is already stored, thus allowing some data of the subsequently received receiving frame to overwrite some data of the receiving frame already stored.

2. A communication control apparatus according to claim 1, wherein at least said transmitting RAM and said receiving RAM are integrated in the same circuit so that said transmitting RAM and receiving RAM are formed into a two-port arrangement for reading data at the forming of each said transmitting frames, and for writing data at the detection of each said receiving frames.

3. A communication control apparatus according to claim 1, wherein said fourth means comprises a plurality of registers, each register being operative for storing therein word lengths and top addresses of said transmitting RAM and said receiving RAM for each of said transmitting and receiving frames.

4. A communication control apparatus according to claim 1, wherein said fourth means comprises a plurality of first-in first-out memories, each said memories being operative for storing therein word lengths and top addresses of said transmitting RAM and said receiving RAM for each of said transmitting and receiving frames.

5. A communication control apparatus according to claim 4, further including means for outputting a synchronizing signal in synchronism with internally generated timing information, for providing synchronization with an external device.

6. A communication control apparatus according to claim 1, wherein said second means is operative to generate information indicating detection of a specific receiving address included in said receiving frame.

7. A communication control apparatus according to claim 1, wherein said second means is operative to retain information at detection of a specific receiving address within said plurality of receiving frames.

8. A communication control apparatus according to claim 1, wherein each of said host and I/O control unit further comprises:

means for writing data forming a plurality of said transmitting frames to said transmission RAM;

transmission start timer means for generating timing signals; and means for automatically transmitting said plurality of transmitting frames a plurality of times in accordance with said timing signals from said transmission start timer means per said predetermined unit time.

9. A communication control apparatus according to claim 8, further comprising means for retaining receiving status information, said status information indicating an amount of receiving data in a receiving frame that is greater than a predetermined number; and means for successively retaining automatically the status information retained in said retaining means.

10. A numerical control machine having a communication control apparatus comprising:

a host control unit;

a remote-control machine input-output unit;

a servo-amplifier unit;

a main-spindle amplifier unit;

serial communication means;

wherein said host control unit, said remote-control machine input-output unit, said servo-amplifier unit, and said main-spindle amplifier unit are connected together by said serial communication means;

means for executing transmission and receipt of a plurality of frames between said host control unit, said remote-control machine input-output unit, said servo-amplifier unit and said main-spindle amplifier unit, during every predetermined unit of time;

first means for successively reading out words forming a periodic transmission frame from a transmitting RAM when data transmission is to occur;

second means for writing the words forming a periodic receiving frame to a receiving RAM when data receipt occurs;

third means for controlling the repeating of said transmission and receipt operations by said first and second means in correspondence with said predetermined unit of time;

fourth means for storing therein a plurality of top address and a plurality of word lengths for said transmitting RAM and said receiving RAM, a separate top address being provided for each transmitting and receiving frame, said fourth means storing the receiving word length of every said receiving frame which has been determined before said receiving frames are written to said receiving RAM;

count means for counting the number of receiving words included in each said receiving frame as received to provide a count value;

comparing means for comparing the receiving word lengths stored in said fourth means to said count value;

status information retaining means, responsive to said comparing means, for determining an excess or deficiency of the number of receiving words in a receiving frame; and means for causing said receiving RAM to provide a blank area in its memory between memory locations where a receiving frame having a deficiency in the number of receiving words and a subsequent receiving frame, respectively, are stored, and causing said receiving RAM to allow a subsequently received receiving frame to be stored in a portion of a memory area in which a frame having an excess in the number of receiving words is already stored, thus allowing some data of the subsequently received receiving frame to overwrite some data of the receiving frame already stored.

11. A communication control apparatus according to claim 10, wherein at least said transmitting RAM and said receiving RAM are integrated in the same circuit so that said transmitting RAM and said receiving RAM are formed into a two-port arrangement for reading data at the forming of each said transmitting frames, and for writing data at the detection of each said receiving frames.

12. A communication control apparatus according to claim 10, wherein said fourth means comprises a plurality of registers, each register being operative for storing therein word length and top addresses of said transmitting RAM and said receiving RAM for each of said transmitting and receiving frames.

13. A communication control apparatus according to claim 10, wherein said fourth means comprises a plurality of first-in first-out memories, each said memories being operative for storing therein word lengths and top addresses of said transmitting RAM and said receiving RAM for each said transmitting and receiving frames.

14. A communication control apparatus according to claim 13, further including means for outputting a synchronizing signal in synchronism with internally generated timing information, for providing synchronization with an external device.

15. A communication control apparatus according to claim 10, wherein said second means is operative to generate information indicating detection of a specific receiving address included in said receiving frame.

16. A communication control apparatus according to claim 10, wherein said second means retains information at detection of a specific receiving address within said plurality of receiving frames.

17. A method of communication between a host control unit and an I/O control unit connected to said host control unit by a serial communication link, comprising the steps of:

assembling transmit data into a plurality of frames;

assigning each frame a top address and identifying the number of words in each frame;

separately and concurrently storing the top address for each of the plurality of frames and the transmitting data length for each said frame;

successively accessing said stored top addresses and transmitting data length values;

reading out said plural frames on the basis of said accessed addresses and values for successive transmission in successive predetermined time intervals; and allocating areas in memory for storing each of said frames, each of said areas being larger than the transmitting data length of said frame being stored therein, to provide a margin between each adjacently stored frames.

18. The method of communicating according to claim 17 whereby the transmit data for a plurality of frames may be set by a single CPU processing.

19. The method of communicating according to claim 17 further comprising the steps of:

setting a predetermined timing interval; and repeatedly identifying the expiration of said intervals; and wherein said successive accessing step is conducted at said predetermined time intervals, in response to said identifying step.

20. The method of communicating according to claim 17 further comprising receiving said transmitted data as a plurality of receiving frames.

21. The method of communicating according to claim 17 wherein said receiving step comprises;

separately and concurrently storing the top address for each of the plurality of receiving frames and the received data length for each said frame;

successively accessing said stored top addresses and received data length values; and writing into memory said plural receiving frames on the basis of said accessed addresses and values for successive transmission in said predetermined time intervals.

* * * * *